US011188992B2

(12) United States Patent
Zhang et al.

(10) Patent No.: US 11,188,992 B2
(45) Date of Patent: Nov. 30, 2021

(54) INFERRING APPROPRIATE COURSES FOR RECOMMENDATION BASED ON MEMBER CHARACTERISTICS

(71) Applicant: Microsoft Technology Licensing, LLC, Redmond, WA (US)

(72) Inventors: Siyuan Zhang, Mountain View, CA (US); Qin Iris Wang, Cupertino, CA (US); Dan Shacham, Sunnyvale, CA (US); Mohsen Jamali, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/366,728

(22) Filed: Dec. 1, 2016

(65) Prior Publication Data

US 2018/0158163 A1 Jun. 7, 2018

(51) Int. Cl.
*G06Q 10/00* (2012.01)
*G06Q 50/20* (2012.01)
*G06Q 50/00* (2012.01)

(52) U.S. Cl.
CPC ......... *G06Q 50/2057* (2013.01); *G06Q 50/01* (2013.01)

(58) Field of Classification Search
CPC ........................... G06Q 50/2057; G06Q 50/01
USPC ......................................... 705/319, 320, 321
See application file for complete search history.

(56) References Cited

U.S. PATENT DOCUMENTS 8,549,629 B1 * 10/2013 McCreesh ............. G06F 21/316 726/22
2002/0026452 A1 * 2/2002 Baumgarten .......... G06Q 10/10
2003/0046265 A1 * 3/2003 Orton ..................... G06Q 10/10
2003/0078821 A1 * 4/2003 Gorur .................... G06Q 10/06 705/7.42
2003/0177027 A1 * 9/2003 DiMarco ............ G06Q 10/1053 705/321
2007/0088563 A1 * 4/2007 Nardotti, Jr. ......... G06Q 20/102 705/40
2007/0185722 A1 * 8/2007 Clarke ............... G06Q 10/1053 705/321
2007/0208575 A1 * 9/2007 Habichler .............. G06Q 10/10 705/7.42

(Continued)

*Primary Examiner* — Gabrielle A McCormick
(74) *Attorney, Agent, or Firm* — Schwegman Lundberg & Woessner, P.A.

(57) ABSTRACT

A system and method for inferring appropriate courses for recommendation based on member characteristics is disclosed. A social networking system receives a request for recommended courses, wherein the request is associated with a member of the social networking system. The social networking system identifies a group of members who are similar to the first member. The social networking system creates a list of recently learned skills by members of the group of members similar to the member. For a particular skill in the list of skills, the social networking system determines whether the member possesses the particular skill. In accordance with a determination that the member does not possess the particular skill, the social networking system identifies at least one course that teaches the particular skill from a list of courses. The social networking system transmits the identified course to the client device for display as a recommended course.

20 Claims, 11 Drawing Sheets

(56) References Cited

U.S. PATENT DOCUMENTS

2007/0259324 A1* 11/2007 Frank ........................ G09B 5/14 434/322
2010/0125475 A1* 5/2010 Twyman ................ G06Q 10/00 705/7.42
2011/0177480 A1* 7/2011 Menon ..................... G09B 7/00 434/238
2013/0167039 A1* 6/2013 Howell ............... G06F 16/9535 715/748
2013/0282606 A1* 10/2013 Bhagat ............... G06Q 10/1053 705/321
2014/0025827 A1* 1/2014 Konuk .................... H04L 67/10 709/226
2014/0173489 A1* 6/2014 Kovacs ............... G06F 3/04883 715/772
2014/0244561 A1* 8/2014 Cheng .................... G06Q 50/01 706/46
2014/0324721 A1* 10/2014 Rennison ............. G06Q 10/105 705/321
2014/0329210 A1* 11/2014 Masood ................... G09B 7/02 434/219
2015/0317760 A1* 11/2015 Pham ................. G06Q 50/2057 705/328
2015/0371172 A1* 12/2015 Minter ............. G06Q 10/06398 705/7.42
2016/0086134 A1* 3/2016 Schwab ............. G06Q 10/1053 705/321
2016/0140857 A1* 5/2016 Jimenez ................... G09B 7/00 434/219
2016/0232462 A1* 8/2016 Woodward ........... G06Q 10/067
2016/0267616 A1* 9/2016 Smith ..................... G06F 16/34
2017/0124157 A1* 5/2017 Keohane ............ G06Q 10/0639
2017/0372215 A1* 12/2017 Platt ...................... G06F 16/245
2018/0090022 A1* 3/2018 Bouillet ............. G06Q 50/2057

* cited by examiner

INFERRING APPROPRIATE COURSES FOR RECOMMENDATION BASED ON MEMBER CHARACTERISTICS

TECHNICAL FIELD

The disclosed example embodiments relate generally to the field of data analytics and, in particular, to inferring appropriate courses for recommendation based on member characteristics in a social networking system.

BACKGROUND

The rise of the computer age has resulted in increased access to personalized services online. As the cost of electronics and networking services drops, many services can be provided remotely over the Internet. For example, entertainment has increasingly shifted to the online space, with companies such as Netflix and Amazon streaming television shows and movies to members at home. Similarly, electronic mail (e-mail) has reduced the need for letters to be physically delivered. Instead, messages are sent over networked systems almost instantly.

Another service provided over networks is social networking. Large social networks allow members to connect with each other and share information. Social networks enable members to share and view information about their careers and skills. This career and skill information can be analyzed to determine where a member of the social network is in their career and to predict or suggest next steps.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

The present disclosure describes methods, systems, and computer program products for using member profile information to match members with learning opportunities provided by a social networking system or a related service. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

In some example embodiments, the social networking system has a plurality of members. Some of the members are interested in using the services of the social networking system to enhance or further their careers. One potential way to do that is to acquire new skills. Learning new skills can increase the number of jobs for which the member is qualified to apply for.

To this end, the social networking system can access a member profile associated with the member, including educational history, work history, current job, location, current skills, and so on. By analyzing this information, the social networking system can identify one or more skills that would be appropriate for the member to learn.

Identifying appropriate skills can be based on a number of factors. Such factors include determining which skills are currently the most popular. One example method to measure the current popularity of a skill is to calculate the number of members who have added that skill in the most recent year (or any other applicable time frame). Skills with the highest numbers of members adding them in the applicable period of time are deemed the most popular.

In other example embodiments, the social networking system can use the learning history of the member to identify new skills or courses that the member should engage with. For example, the social networking system can analyze the past courses that the member has taken and, based on that information, identify future skills to learn. For example, the social networking system can identify a particular subject or area of interest for the member and identify skills in that area that the member does not have yet.

Figure 1:
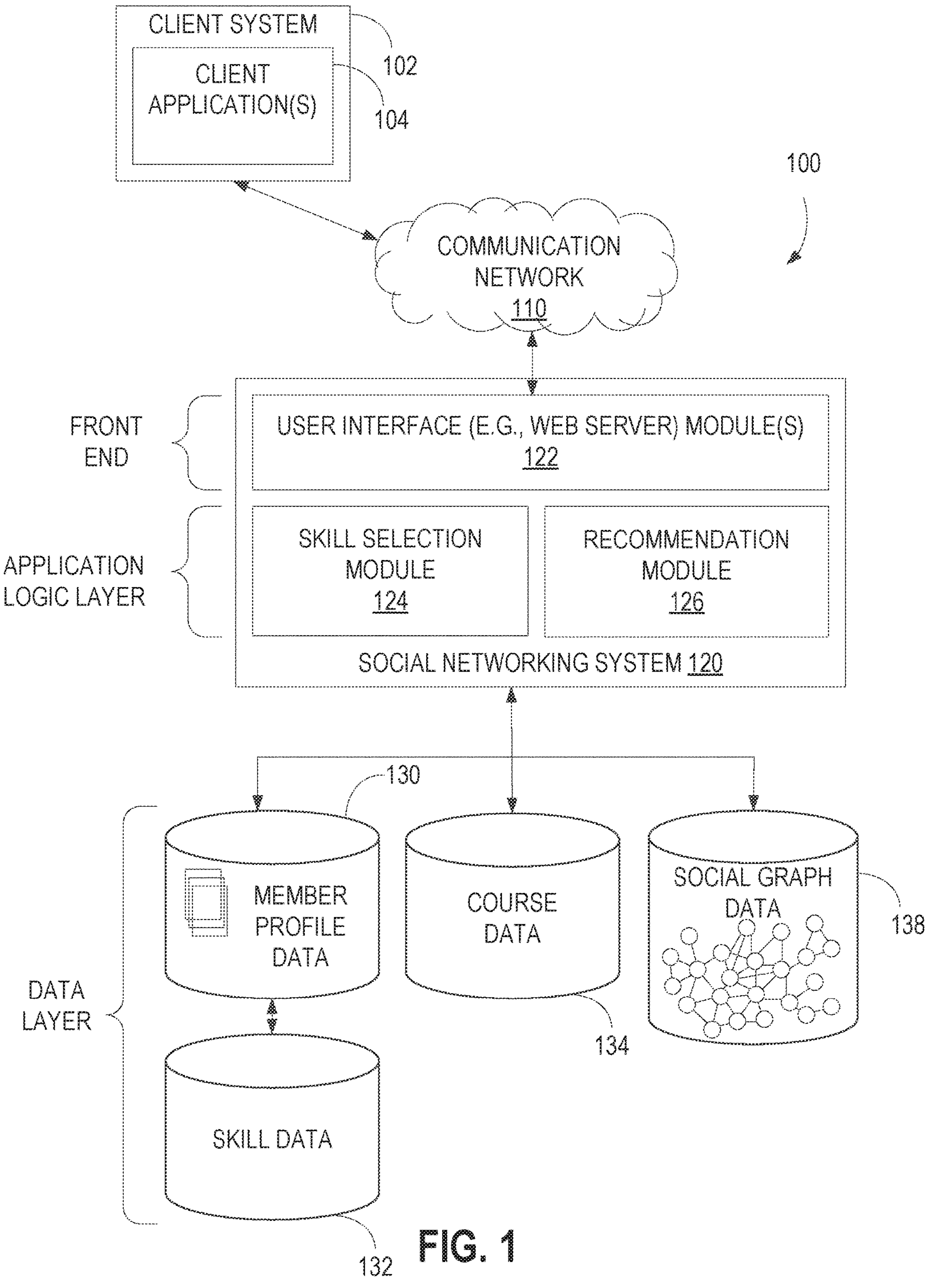
FIG. 1 is a network diagram depicting a client-server system that includes various functional components of a social networking system, in accordance with some example embodiments.

In other example embodiments, the social networking system identifies a group of members who are similar to a particular member member of the social networking system (e.g., the server 120 in FIG. 1). In some example embodiments, the group of members is identified based on member profile information including one or more of: age, title, work history, experience, educational history, and so on. The social networking system then analyzes the group of similar members to identify the most common skills possessed by members of this group. Using this list of common skills, the social networking system identifies skills on this list that the first member does not possess. The skills that similar members have but the first member does not can be recommended to the first member.

In other example embodiments, the social networking system identifies, from historical member data, members who were similar to the first member in the past. For example, the social networking system can analyze the profiles of members as they existed 3-5 years ago and identify members whose past profiles are similar to the current profile of a particular member. Once this group of past similar members is identified, the social networking system can analyze their subsequent work histories (e.g., which jobs did they move on to, what skills did they learn) to identify one or more potential career paths for the first member. Using these potential career paths, the social networking system can then identify one or more skills associated with the career paths (e.g., based on jobs in the career path or particular skills needed).

Once a number of recommended skills are identified, the social networking system ranks them based on a confidence score assigned to each potential skill based on the social networking system's estimation of the likelihood that the member will want to learn the particular skill. In some example embodiments, the social networking system then identifies one or more courses for each skill based on skill information stored for each course. The courses associated with the most highly ranked skills can then be recommended to the member.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses the web browser to send and receive requests to and from the social networking system 120 and to display information received from the social networking system 120.

In some example embodiments, the client system 102 includes an application specifically customized for communication with the social networking system 120 (e.g., a LINKEDIN® IPHONE® application). In some example embodiments, the social networking system 120 is a server system that is associated with one or more services.

In some example embodiments, the client system 102 sends a request to the social networking system 120 for course recommendations for one or more courses. For example, a member of the social networking system 120 uses the client system 102 to log into the social networking system 120 and request one or more course recommendations. In response, the client system 102 receives the ranked list of recommended courses from the social networking system 120 and displays that ranked list of courses in a user interface on the client system 102.

In some example embodiments, as shown in FIG. 1, the social networking system 120 is based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module(s) (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, skill data 132, course data 134, and social graph data 138, which is data stored in a particular type of database that uses graph structures with nodes, edges, and properties to represent and store data. Of course, in various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes or is associated with member interaction data. In other example embodiments, the member interaction data is distinct from, but associated with, the member profile data 130. The member interaction data stores information detailing the various interactions each member has through the social networking system 120. In some example embodiments, interactions include posts, likes, messages, adding or removing social contacts, and adding or removing member content items (e.g., a message or like), while others are general interactions (e.g., posting a status update) and are not related to another particular member. Thus, if a given member interaction is directed towards or includes a specific member, that member is also included in the membership interaction record.

In some example embodiments, the member profile data 130 includes the skill data 132. In other example embodiments, the skill data 132 is distinct from, but associated with, the member profile data 130. The skill data 132 stores skill data for each member of the social networking system 120. The skill data 132 may include both explicit skills and implicit skills.

In some example embodiments, explicit skills are skills that the member is determined to have based on skill information directly received from the member. For example, a member reports that they have skills in using the C++, Java, PHP, CSS, and Python programming languages. Because the member directly reported these skills, they are considered explicit skills. In some example embodiments, explicit skills are listed on a member's public profile.

In some example embodiments, one or more skills are determined based on an analysis of the non-skill data stored in a member profile. Skills determined in this way are considered implicit skills. Implicit skills are determined or inferred by analyzing data stored in a member profile, including but not limited to education, job history, hobbies, friends, skill ratings, interests, projects a member has worked on, activity on the social networking system 120, and member-submitted comments. In some example embodiments, implicit skills may also be called inferred skills or skills a member may have. For example, member A lists an undergraduate degree in architecture and has a past job history that includes Project Architect for at least three different projects. The social networking system 120 determines that member A has a skill in AutoCAD even though member A has not directly reported having that skill. In some example embodiments, implicit skills are not listed on a member's public profile.

In some example embodiments, the course data 134 includes data that logs or records a member's history of accessing educational material. In some example embodiments, educational material access history data includes one or more material access records, each of which details a particular instance of the member accessing a particular piece of educational material. In some example embodiments, each material access record details the member who accessed the educational materials, the time of the access, the course associated with the educational materials, and how much of the educational materials was read, watched, listened to, or completed.

In some example embodiments, the course data 134 also includes educational materials. Each piece of educational material is a media content item. Media content items include text items, video content items, audio content items, interactive content items (e.g., quizzes and so on), and any other materials that can be used in an educational course. In some example embodiments, each piece of educational material is associated with a specific educational course. In some example embodiments, the course data 134 also includes metadata about each course, such as the content covered by a course, its subject area, the skills that the course covers, and so on.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," "following" another member typically is a unilateral action and, at least in some example embodiments, does not include acknowledgement or approval by the member who is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, organized around subject matter or a topic of interest. In some example embodiments, the data for a group may be stored in a database. When a member joins a group, his or her membership in the group will be reflected in the member profile data 130 and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A skill selection module 124 or a recommendation module 126 can also be included in the application logic layer. Of course, other applications or services that utilize the skill selection module 124 and the recommendation module 126 may be separately implemented in their own application server modules.

As illustrated in FIG. 1, in some example embodiments, the skill selection module 124 and the recommendation module 126 are implemented as services that operate in conjunction with various application server modules. For instance, any number of individual application server modules can invoke the functionality of the skill selection module 124 and the recommendation module 126. However, in various alternative example embodiments, the skill selection module 124 and the recommendation module 126 may be implemented as their own application server modules such that they operate as standalone applications.

Generally, the skill selection module 124 receives a request for a course recommendation. In response, the skill selection module 124 identifies one or more skills that are appropriate for the member to acquire. In some example embodiments, the skill selection module 124 analyzes the member profile for a member who has requested course recommendations.

In some example embodiments, the skill selection module 124 calculates a learning rate for all skills. A learning rate is a calculation of the number of members who have acquired the given skill during a fixed period of time. The skills then can be ranked based on the calculated learning rate. In some example embodiments, the skills with a learning rate (e.g., the number of members who have acquired the skill in a given time period) above a predetermine threshold or in a certain percentage (e.g., skills above a predetermined threshold or percentage) are selected. In other example embodiments, the skills are grouped by skill subject or skill type and only the skills within a skill topic group associated with the requesting member are considered when ranking skills.

In some example embodiments, the skill selection module 124 identifies appropriate skills by identifying members who are similar to the requesting member. In some example embodiments, identifying members includes grouping or clustering members based on one or more characteristics of the members. Any number of clustering techniques can be used. For example, the members can be represented as n-dimensional vectors, wherein the vectors represent the information associated with each member as a point in n-dimensional space.

Once the members are represented as n-dimensional vectors, a centroid-based clustering algorithm such as Lloyd's algorithm can be used to group members into a plurality of different groups. Then, members who are grouped into the same member group as the requesting member are determined to be similar members. In some example embodiments, the inputs that create the vectors (and are thus used to cluster members into groups are the members age, industry, skills, title, seniority, and so on).

In some example embodiments, the skill selection module 124 analyzes the skills associated with the determined similar members. In some example embodiments, the skill selection module 124 generates a list of skills for each member.

Using the list of skills for each similar member, the skill selection module 124 generates a ranked list of skills based on the number of similar members who have the skill (e.g., the more members in the group of similar members who possess the skill, the higher the skill is ranked). The skill selection module 124 can then analyze the ranked list of skills to identify any skills that the requesting member is missing.

In other example embodiments, the skill selection module 124 uses historical member information to identify member profiles in the past that are similar to the current member's profile. To accomplish this, the skill selection module 124 accesses historical member profiles from a particular period in the past (e.g., 3-5 years ago). The skill selection module 124 then uses a clustering algorithm on the past member profiles (and the current requesting member profile).

Once a group of past member profiles are identified as being similar to the current requesting member's profile, the skill selection module 124 analyzes the subsequent history of those member to identify the most common jobs that those members moved to and the most common skills those members learned subsequently. The skill selection module 124 then uses these jobs and skills as potential future career paths for the requesting member. Each potential future career path includes one or more jobs and associated skills. For each path, the skill selection module 124 selects a skill to recommend to the member.

In some example embodiments, the recommendation module 126 receives a list of skills from the skill selection module 124 that are appropriate for the requesting member. The recommendation module 126 then matches each skill in the list of skills with one or more courses based on metadata about the courses. For example, each course has a list of skills that are taught by the course. The recommendation module 126 then ranks each matching course based on one of: the popularity of the skills taught by the course, the preferences of the member, and member reviews after taking the course In some example embodiments, the top-ranked course recommendations are transmitted to the requesting member for display.

Figure 2:
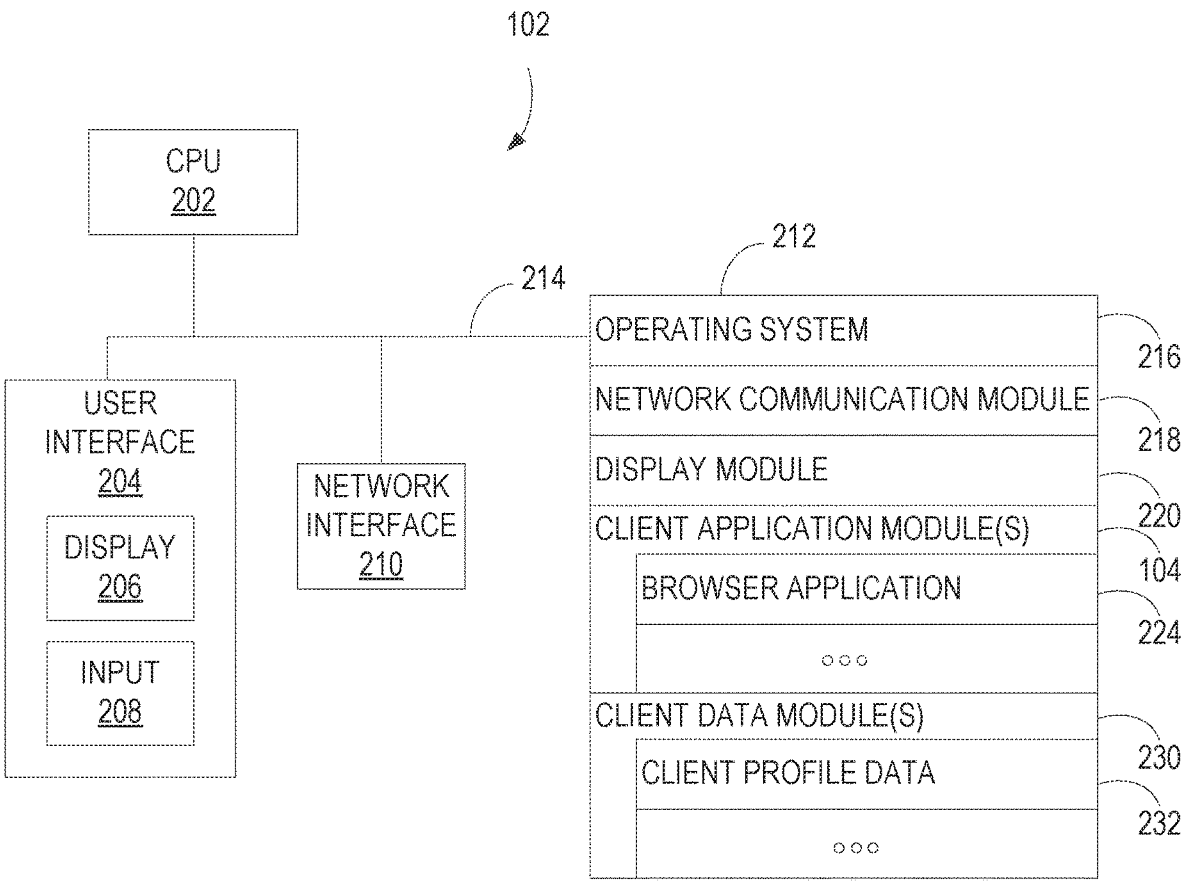
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:

- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;
- a display module 220 for enabling the information generated by the operating system 216 and client application(s) 104 or received from the social networking system (e.g., the server 120 in FIG. 1) (such as course recommendations) to be presented visually on the display device 206;
- one or more client application(s) 104 for handling various aspects of interacting with the social networking system (e.g., social networking system 120 in FIG. 1), including but not limited to:
- a browser application 224 for requesting information from the social networking system 120 (e.g., course recommendations) and receiving responses from the social networking system 120; and client data module(s) 230 for storing data relevant to clients, including but not limited to:

client profile data 232 for storing profile data related to a member of the social networking system 120 associated with the client system 102.

Figure 3:
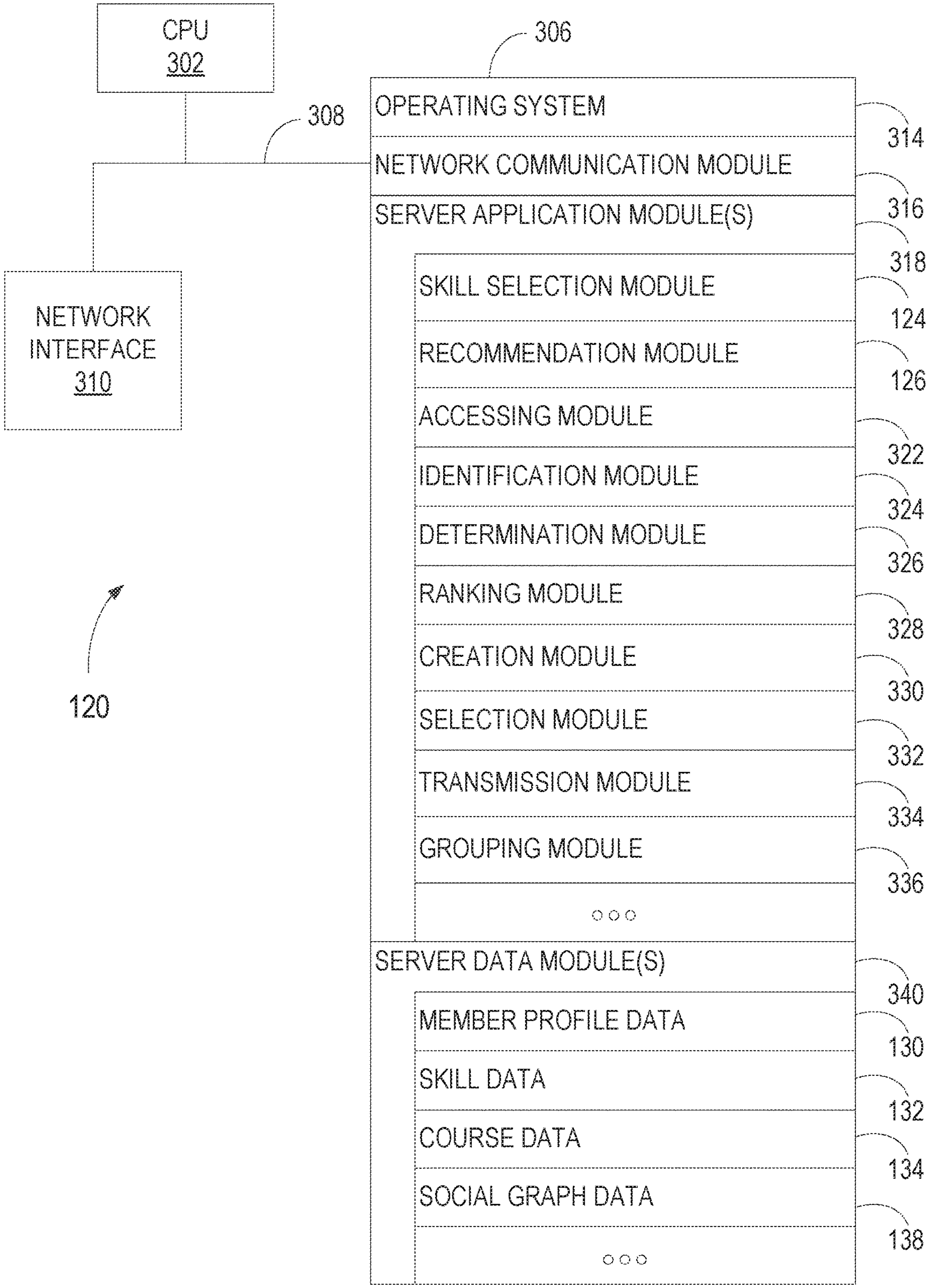
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:

an operating system 314 that includes procedures for handling various basic system services and for performing hardware-dependent tasks;

a network communication module 316 that is used for connecting the social networking system 120 to other computers via the one or more network interfaces 310 (wired or wireless) and one or more communication networks 110, such as the Internet, other WANs, LANs. MANs, and so on;

one or more server application modules 318 for performing the services offered by the social networking system 120, including but not limited to:

a skill selection module 124 for selecting, based on information in a first member's member profile, one or more skills that are appropriate for the member to acquire;

a recommendation module 126 for identifying one or more courses associated with selected skill skills for recommendation to a requesting member;

an accessing module 322 for accessing skill data 132 in member profiles and course metadata in course data 134;

an identification module 324 for identifying members who are similar to the first member and identifying courses that are associated with particular skills;

a determination module 326 for determining whether the first member possesses a particular skill;

a ranking module 328 for ranking skills or courses based on member profile data;

a creation module 330 for creating a list of skills recently acquired by a group of members based on their education and skill history data in the member profile data;

a selection module 332 for selecting one or more courses to recommend based on course ranking data;

a transmission module 334 for transmitting a selected course recommendation to a client system (e.g., the client system 102 in FIG. 1) for display; and a grouping module 336 for clustering members of a social networking system (e.g., the social networking system 120 in FIG. 1) into a plurality of groups based on data in the member profiles; and server data module(s) 340, holding data related to the social networking system 120, including but not limited to:

member profile data 130, including both data provided by the member, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, social graph data 138, overall trend data for the social networking system 120, and so on;

skill data 132 including data representing a member's stated or inferred skills;

course data 134 including data describing one or more courses, data about past course access by members, and educational material data; and social graph data 138 including data that represents members of the social networking system 120 and the social connections among them.

Figure 4:
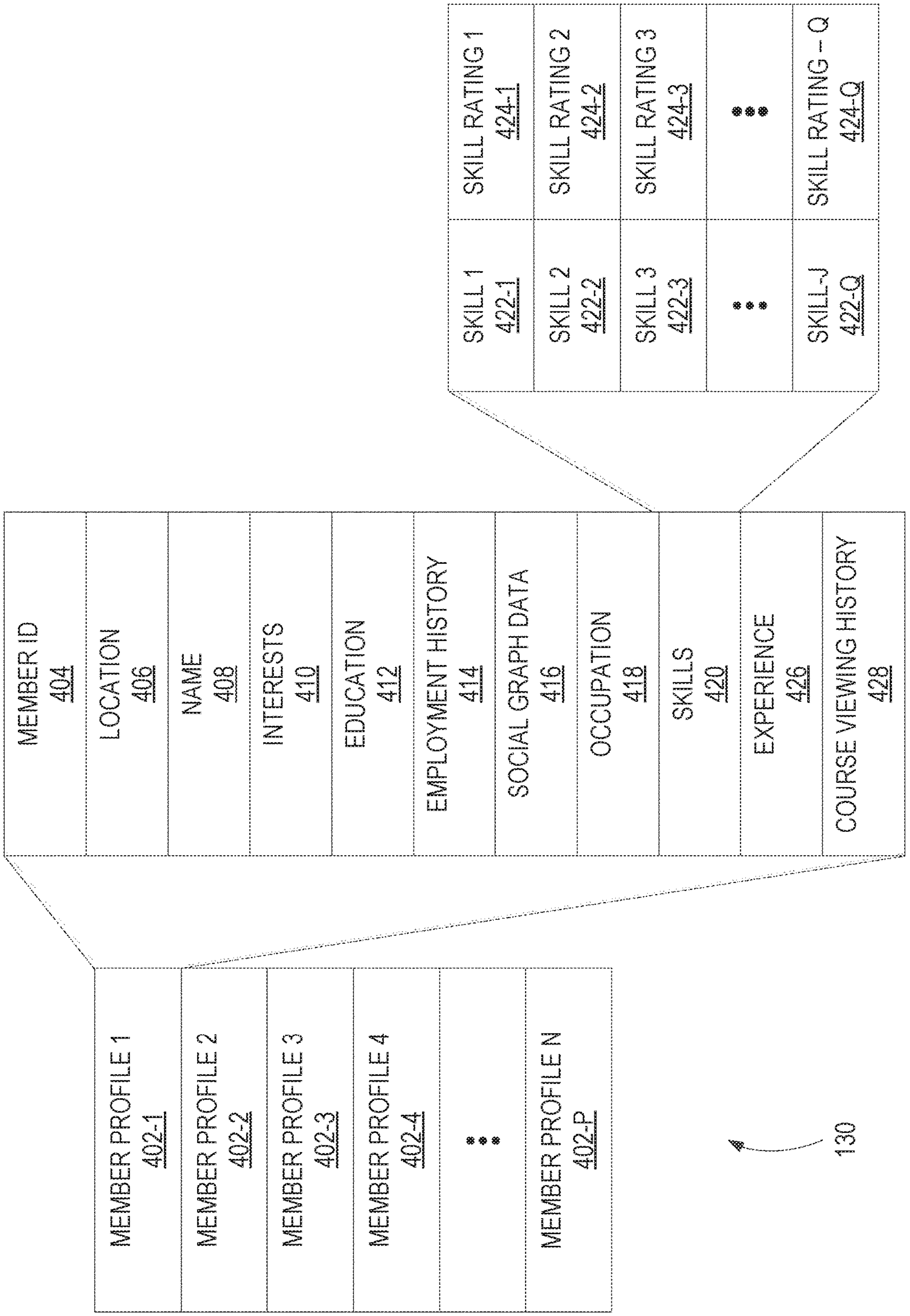
FIG. 4 is a block diagram of an example data structure for member profile data for storing member profiles in accordance with some example embodiments.

FIG. 4 is a block diagram of an exemplary data structure for the member profile data 130 for storing member profiles, in accordance with some example embodiments. In accordance with some example embodiments, the member profile data 130 includes a plurality of member profiles 402-1 to 402-P, each of which corresponds to a member of the social networking system 120.

In some example embodiments, a respective member profile 402 stores a unique member ID 404 for the member profile 402, a location 406 associated with the member (e.g., the location that the member indicated was their location), a name 408 for the member (e.g., the member's legal name), member interests 410, member education history 412 (e.g., the high school and universities the member attended and the subjects studied, online courses or certifications, licenses, and so on), employment history 414 (e.g., member's past and present work history with job titles), social graph data 416 (e.g., a listing of the member's relationships as tracked by the social networking system 120), occupation 418, skills 420, experience 426 (for listing experiences that don't fit under other categories, such as community service or serving on the board of a professional organization), and a detailed course viewing history 428 (e.g., a list of all courses taken through the social networking system 120 or associated educational sites).

In some example embodiments, a member profile 402 includes a list of skills 422-1 to 422-Q. Each skill 422 represents a skill or ability that the member associated with the member profile 402 has. For example, a computer programmer might list FORTRAN as a skill.

Figure 5:
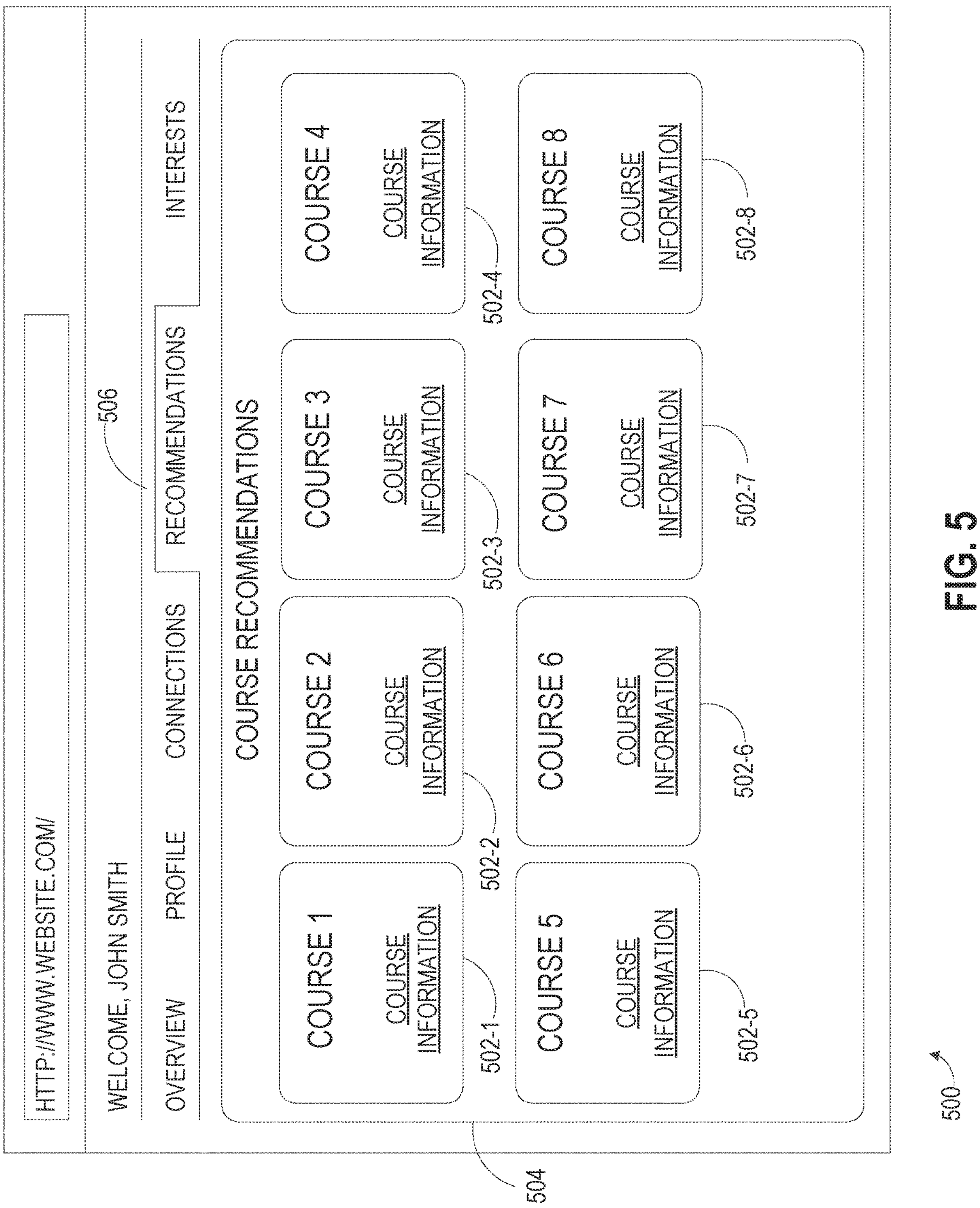
FIG. 5 is a user interface diagram illustrating an example of a user interface or web page that incorporates a list of course recommendations to a member of a social networking system.

FIG. 5 is a user interface diagram illustrating an example of a user interface 500 or web page that incorporates a list of course recommendations to a member of a social networking system (e.g., the social networking system 120 in FIG. 1). In the example user interface 500 of FIG. 5, the displayed user interface 500 represents a web page for a member of the social networking system (e.g., the social networking system 120 in FIG. 1) with the name John Smith.

As can be seen, a recommendations tab 506 has been selected and a page of relevant course recommendations 504 is displayed. The course recommendations 504 are determined based on the skills possessed by the requesting member and members similar to the requesting member. Specifically, courses that teach skills that the requesting member does not have but that are possessed by members who are or were similar to the requesting member are more likely to be recommended. Each course recommendation 502-1 to 502-8 displays a link to additional information about the course, including information about the course contents, the course prerequisites, and how to access the course or enroll in the course. In some example embodiments, the course recommendations also display information as to why that particular course is being recommended to the member (not shown in FIG.). For example, if a course is being recommended because it will help the member qualify for a particular job or type of job that can be displayed to the member on the course commendation page.

Figure 6:
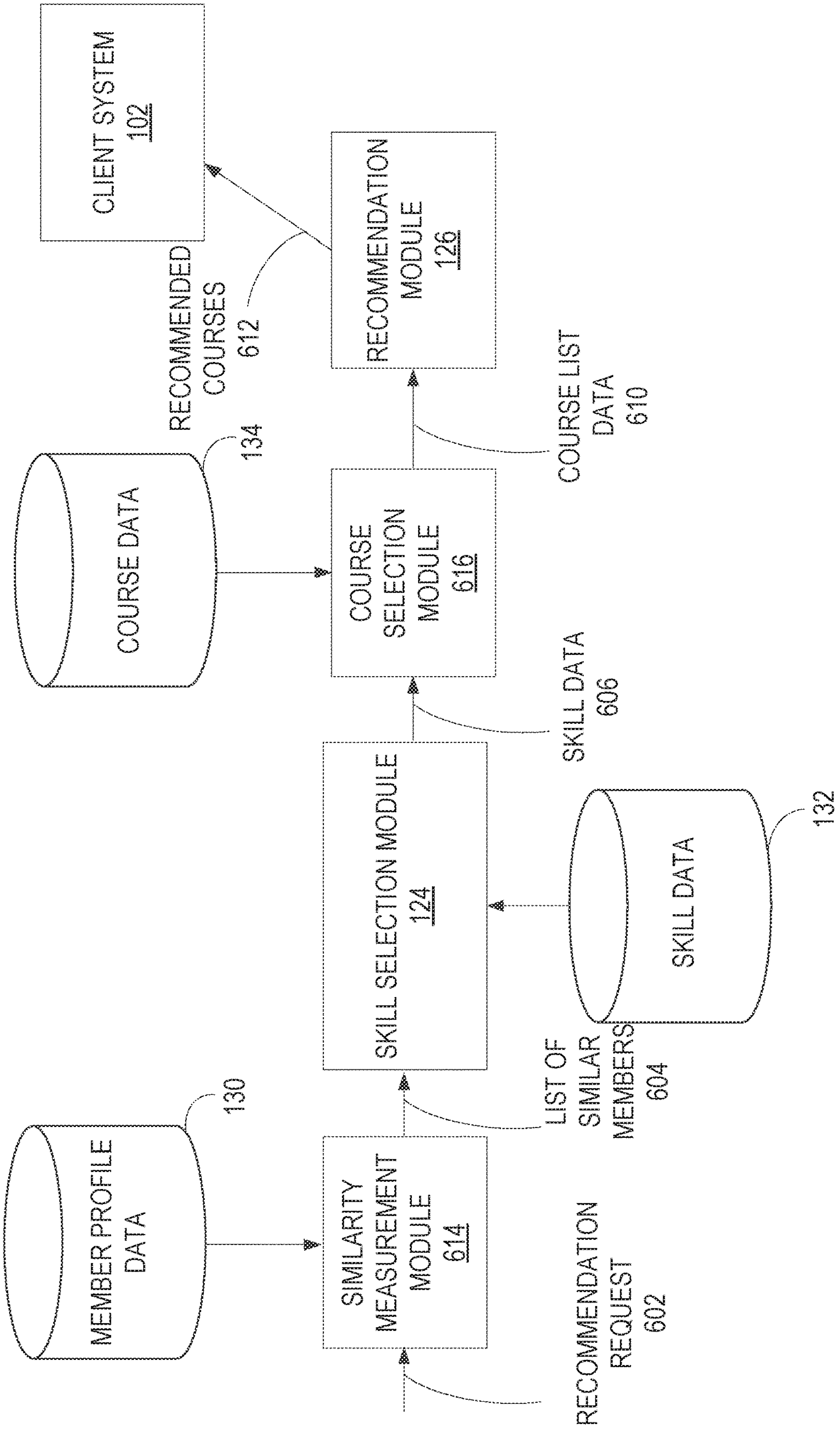
FIG. 6 is a block diagram illustrating a system, in accordance with some example embodiments, for identifying similar members, analyzing the profiles of those members to identify key skills, and recommending courses that teach those skills to members of a social networking system.

FIG. 6 is a block diagram illustrating a system, in accordance with some example embodiments, for identifying similar members, analyzing the profiles of those members to identify key skills, and recommending courses that teach those skills to members of a social networking system (e.g., the social networking system 120 in FIG. 1). In some example embodiments, the system is depicted as a functional diagram of modules and data stores.

In some example embodiments, the social networking system (e.g., the social networking system 120 in FIG. 1) receives a recommendation request 602 from a first member. The recommendation request 602, in this case, is a request for the social networking system (e.g., the social networking system 120 in FIG. 1) to identify one or more educational courses that would be appropriate for the first member.

In some example embodiments, the recommendation request 602 is received by a similarity measurement module 614. Using information in the recommendation request 602 (e.g., member ID of the first member and any specific course content requests that the first member may have), the similarity measurement module 614 accesses the member profile data 130 and identifies a group of members who are similar to the first member.

In some example embodiments, the similarity measurement module 614 first plots each member in an n-dimensional vector space based on information included in the member profile. For example, information such as demographic information, location information, work history, educational history, and member activity can be used as input to generate a particular n-dimensional point in the n-dimensional vector space. In some example embodiments, this mapping is done using a model created by a deep learning algorithm.

In some example embodiments, the model is created using a deep learning or neural network learning method. In some example embodiments, the social networking system (e.g., the server 120 in FIG. 1) model uses the entire corpus of member profile information, past member interactions, and information about member influence and sales competency to create a model for generating weights.

In another example embodiment, the model is trained to generate appropriate weights using a neural network using a set training data. The training data has all the input data as will be used in a live example, as well as ground truth data (e.g., data that represents the ideal output from the model). In this example, the neural network takes inputs (e.g., member profile data, message data, social graph data, work profile data, title information). Each of these inputs is given a weight and passed to a plurality of hidden nodes. The hidden nodes exchange information, also given weights, to produce an output (in this case one or more factor weights). In some example embodiments, there are several layers of hidden nodes. The model is compared to the ideal output and the weights used by the models are updated until the model produces accurate data. Once the model is trained, the model is tested using a test set of data. The model can then be used to generate the weights used in the decision maker score calculations.

In this example, the similarity measurement module 614 then groups members based on their position in the n-dimensional vector space. In some example embodiments, the members are clustered into groups based on all the data contained in their member profiles. Clustering can be accomplished with a wide variety of clustering algorithms. One example algorithm includes k-means clustering. To use k-means clustering for members, each member is assigned a position in n-dimensional Euclidean space (based on courses accessed). Each member is assigned to a cluster whose center point is the closest using an equation such as:

$$S_i^{(t)}=\{x_p:\|x_p-m_i^{(t)}\|^2\leq\|x_p-m_j^{(t)}\|^2\forall j,\ 1\leq j\leq k\}$$

where each member (x) is assigned to one cluster S at time t, based on which center point (m with coordinates i, j) is closest to the position of the member in the space.

Once members have been assigned to clusters, the central points of the clusters are updated with a formula such as:

$$m_i^{t+1}=\frac{1}{S_i^{(t)}}\sum_{xj\in S_i^{(t)}}x_j$$

Once new central points are determined, the members are clustered again. Once the members stop shifting between clusters, the clusters are determined to have settled.

In this way, members can be grouped into a plurality of groups based on their skills, work history, education, and so on. Once the first member is grouped into a settled group of members, a list is created of the other members in the group (e.g., members who were determined to be similar to the first member during the grouping process). That list of similar members 604 is then transferred to the skill selection module 124.

The skill selection module 124 then determines, for the list of similar members 604, a list of skills that are commonly held by the members based on skill data 132. Skills on this list of skills can be ranked based on a list of factors, including, but not limited to, the frequency of the skills in the group of similar members, how recently the skills were acquired on average (e.g., skills that were acquired recently being ranked higher than skill that were acquired further in the past), a correlation of skills to earnings (e.g., skills associated with higher pay being ranked higher), and so on.

In some example embodiments, each factor is given a weight based on the relative importance of each factor (based on existing metrics or member preferences). For example, a skill ranking score could be using a formula such as:

$$SRS=f1*w1+f2*w2+f3*w3+f4*w4$$

In some example embodiments, this example, each factor (e.g., factors f1-f4) has an associated weight (e.g., a value between 0 to 1 such that all the weights add up to 1). The skill ranking score (SRS) is then used as the bases for ranking each skill.

Once the skills have been identified and ranked, the skill selection module 124 identifies at least one skill in the list of skills that the first member does not possess based on the skill rankings. For example, the skill selection module 124 might identify the five most highly ranked skills that the first member does not possess. In other example embodiments, the skill selection module 124 selects all skills that are above a predetermined threshold.

The one or more selected skills are transmitted to a course selection module 616 as skill data 606. The course selection module 616 then accesses the course data 134 to identify one or more courses that teach one of the skills in the skill data 606 based on information about the courses. For example, each course has associated metadata that lists skills taught or improved by the course. In some example embodiments, the course selection module 616 ranks prospective courses based on member feedback data (e.g., data from members rating the course by quality), course prerequisites, the level of member that the course is aimed at (e.g., a beginner vs. an experienced programmer), and so on.

The course selection module 616 then transmits course list data 610, which includes a list of all potential courses that could be recommended to the first member, including data about each course, such as ranking and content. The recommendation module 126 receives the course list data 610 and selects one or more courses based on the rankings (e.g., the four highest-ranked courses). The recommended courses 612 are transmitted to the client system (e.g., the client system 102 in FIG. 1) for display.

Figure 7:
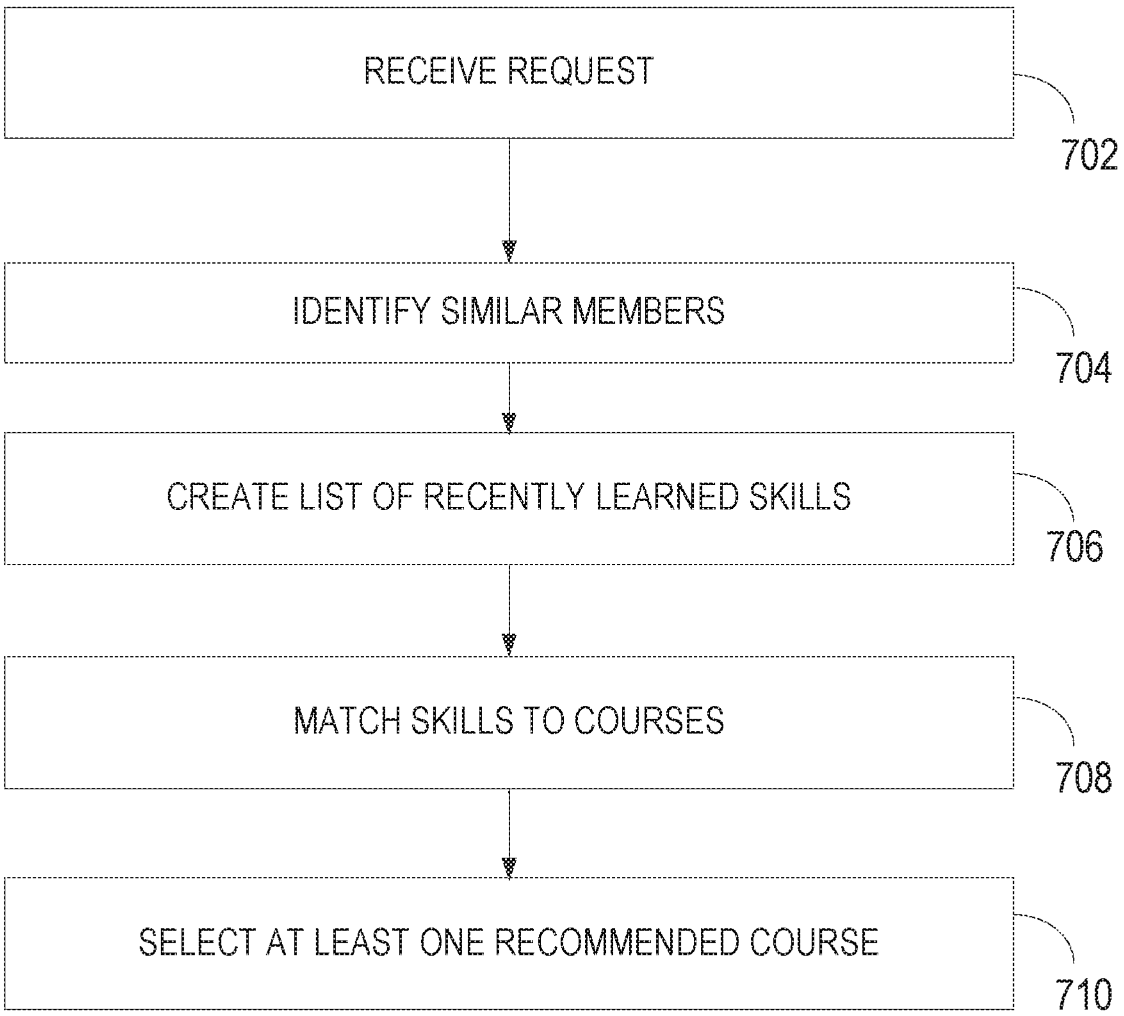
FIG. 7 is a flow diagram illustrating a method, in accordance with some example embodiments, for identifying similar members, analyzing the profiles of those members to identify key skills, and recommending courses that teach those skills to members of a social networking system.

FIG. 7 is a flow diagram illustrating a method, in accordance with some example embodiments, for identifying similar members, analyzing the profiles of those members to identify key skills, and recommending courses that teach those skills to members of a social networking system (e.g., the social networking system 120 in FIG. 1). Each of the operations shown in FIG. 7 may correspond to instructions stored in a computer memory or computer-readable storage medium. In some embodiments, the method described in FIG. 7 is performed by the social networking system (e.g., the social networking system 120 in FIG. 1). However, the method described can also be performed by any other suitable configuration of electronic hardware.

In some embodiments, the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives (702) a request for recommended courses from a computer system (e.g., the computer system 120 in FIG. 1), wherein the request is associated with a first member of the social networking system social networking system (e.g., the server 120 in FIG. 1). In some example embodiments, the client system (e.g., the client system 102 in FIG. 1) requests course recommendations for a member of the social networking system (e.g., the social networking system 120 in FIG. 1) identified in the request (e.g., usually the member who sends the request). For example, a member requests a list of courses that are personalized to their specific career history, interests, and skills. In another example, the request is generated internally by the social networking system (e.g., the server 120 in FIG. 1) to generate a series of recommendations for a member to be displayed as part of a member profile or transmitted to a member without a specific request from the member.

In response to receiving the request, the social networking system (e.g., the social networking system 120 in FIG. 1) identifies (704) a group of members who are similar to the requesting member. As noted above, the social networking system (e.g., the social networking system 120 in FIG. 1) can identify similar members by accessing member profile data and using the member profile data to cluster members into groups. Using the member profile data (e.g., demographic data, work history data, education data, location data, seniority data, and so on), the social networking system (e.g., the social networking system 120 in FIG. 1) maps each member to an n-dimensional vector (e.g., using a deep learning algorithm). The members can then be clustered as noted above.

In some example embodiments, once a group of similar members is identified, the social networking system (e.g., the social networking system 120 in FIG. 1) creates (706) a list of recently learned skills based on skill data stored in a member profile for each of the members. For example, a member profile for a particular member stores a list of skills and a date that each skill was added to the member profile. Using these lists, the social networking system (e.g., the social networking system 120 in FIG. 1) can identify all the skills that a given member or group of members have gained in the past year (or any particular time frame). The social networking system (e.g., the social networking system 120 in FIG. 1) can then identify the most popular skills and compare that list to the list of skills of the first member.

In some example embodiments, the social networking system (e.g., the social networking system 120 in FIG. 1) selects at least one skill that is listed in the list of recently learned skills that the first member does not possess.

The social networking system (e.g., the social networking system 120 in FIG. 1) then matches (708) the at least one selected skill to at least one course stored in a course database at the social networking system (e.g., the social networking system 120 in FIG. 1). For example, each course has associated metadata stored, including a list of skills taught or improved during the course. In some example embodiments, a particular mastery level is also associated with each course.

In some example embodiments, the social networking system (e.g., the social networking system 120 in FIG. 1) identifies all the courses that teach a particular skill and selects (710) at least one for recommendation to the requesting member. In some example embodiments, the recommended courses are selected by ranking the courses based on course reviews, course popularity, the skill level associated with each course (e.g., beginner, expert, advanced, and so on), and the percent of members who take the course and afterwards add the desired skill to their member profile (e.g., by comparing skill data for members with course viewing data). The one or more selected courses are transmitted to the first member for display.

Figure 8A:
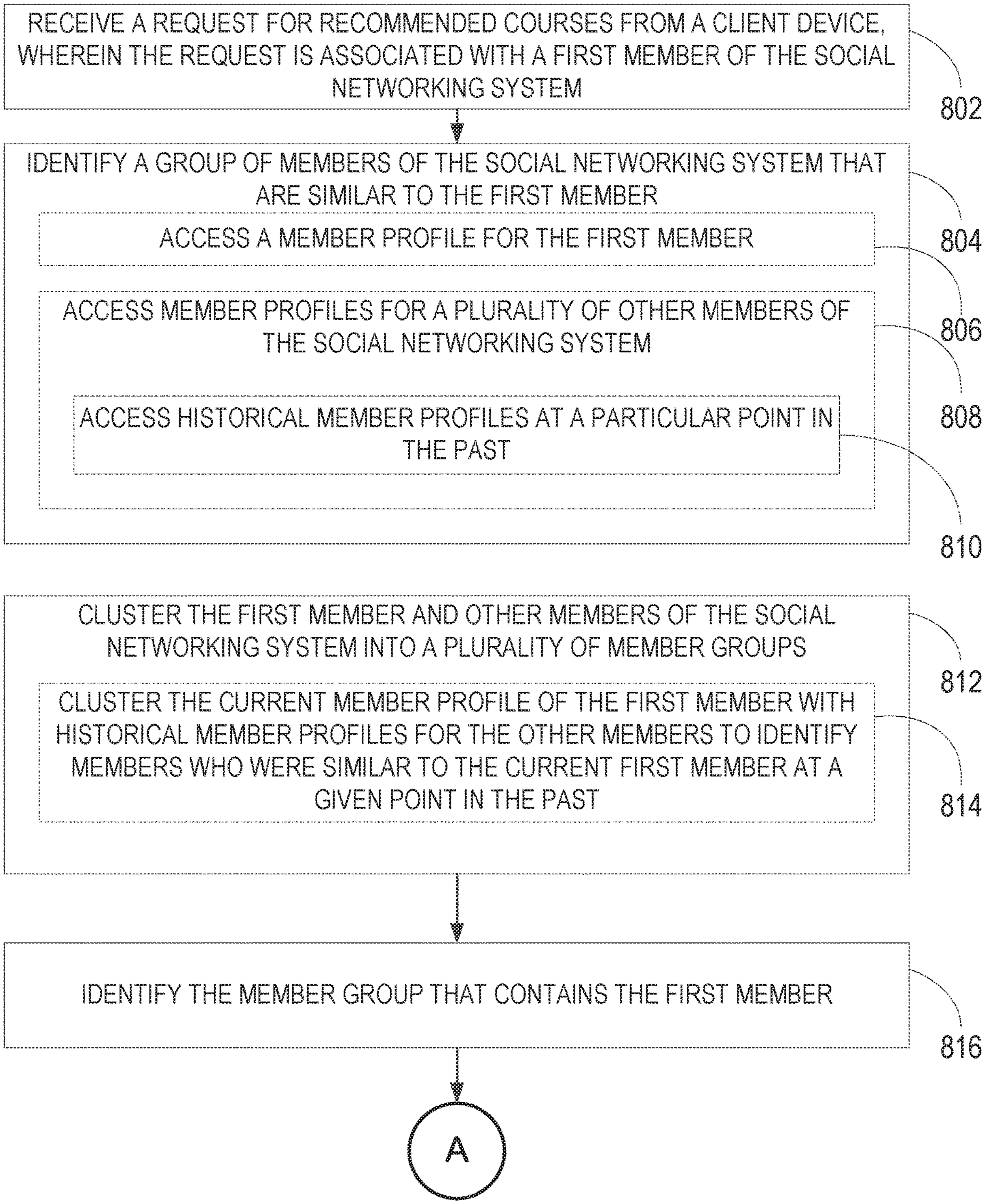
FIGS. 8A-8B are flow diagrams illustrating a method, in accordance with some example embodiments, for recommending courses to a member based on the recent skill acquisitions of similar members of a social networking system.

FIG. 8A is a flow diagram illustrating a method, in accordance with some example embodiments, for recommending courses to a member based on the recent skill acquisitions of similar members of a social networking system (e.g., the social networking system 120 in FIG. 1). Each of the operations shown in FIG. 8A may correspond to instructions stored in a computer memory or computer-readable storage medium. Optional operations are indicated by dashed lines (e.g., boxes with dashed-line borders). In some embodiments, the method described in FIG. 8A is performed by the social networking system (e.g., the social networking system 120 in FIG. 1). However, the method described can also be performed by any other suitable configuration of electronic hardware.

In some embodiments, the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives (802) a request for recommended courses from a client device, wherein the request is associated with a first member of the social networking system. In some example embodiments, the request is generated by the first member accessing a web page designed to display course recommendations to a member. In other embodiments, the request is generated based on the explicit selection by the first member.

In some example embodiments, the social networking system (e.g., the social networking system 120 in FIG. 1) identifies (804) a group of members of the social networking system (e.g., the social networking system 120 in FIG. 1) who are similar to the first member. In some example embodiments, determining the group of similar members includes identifying members with similar jobs (e.g., the social networking system (e.g., the social networking system 120 in FIG. 1) classifies jobs for each member into a particular job sub-group).

In some example embodiments, identifying the group of members who are similar to the first member includes the social networking system (e.g., the social networking system 120 in FIG. 1) accessing (806) a member profile for the first member. In some example embodiments, the social networking system (e.g., the social networking system 120 in FIG. 1) stores a unique member profile for each member of the social networking system (e.g., the social networking system 120 in FIG. 1) in a database or other appropriate data storage structure or system. As noted above, the member profile includes information about the member (e.g., demographic information such as age, gender, sex, and so on, the member's current job, education, work history, skills, social contacts, and so on).

In some example embodiments, the social networking system (e.g., the social networking system 120 in FIG. 1) accesses (808) member profiles for a plurality of other members of the social networking system.

In some example embodiments, accessing member profiles for a plurality of other members of the social networking system further comprises the social networking system (e.g., the social networking system 120 in FIG. 1) accessing (810) historical member profiles from a particular point in the past. For example, the social networking system (e.g., the social networking system 120 in FIG. 1) stores historical records of member profiles such that the system can access the contents of member profiles from one or more points in the past. In some example embodiments, the points in the past can be at any point in the past (e.g., one week, one year, five years, or any other length of time desired).

In some example embodiments, the member profiles include a change log and the past member profile data is calculated by reconstructing member profiles using the change log.

In some example embodiments, the social networking system (e.g., the social networking system 120 in FIG. 1) clusters (812) the first member and other members of the social networking system into a plurality of member groups. As noted above, a variety of clustering techniques can be used to group members based on job title, employer, seniority, past education experience, and so on.

In some example embodiments, the social networking system clusters (814) the current member profile of the first member with historical member profiles for the other members to identify members who were similar to the current first member at a given point in the past. Thus, the social networking system (e.g., the social networking system 120 in FIG. 1) could retrieve member profile data for a plurality of members as they existed two years in the past. Once the current member profile has been clustered with past member profiles, the social networking system (e.g., the social networking system 120 in FIG. 1) can determine potential career paths for the first member based on the skills, jobs, and courses that the historical member profiles have added since the point at which the member profile was captured.

In some example embodiments, the social networking system (e.g., the social networking system 120 in FIG. 1) identifies (816) the member group that contains the first member.

Figure 8B:
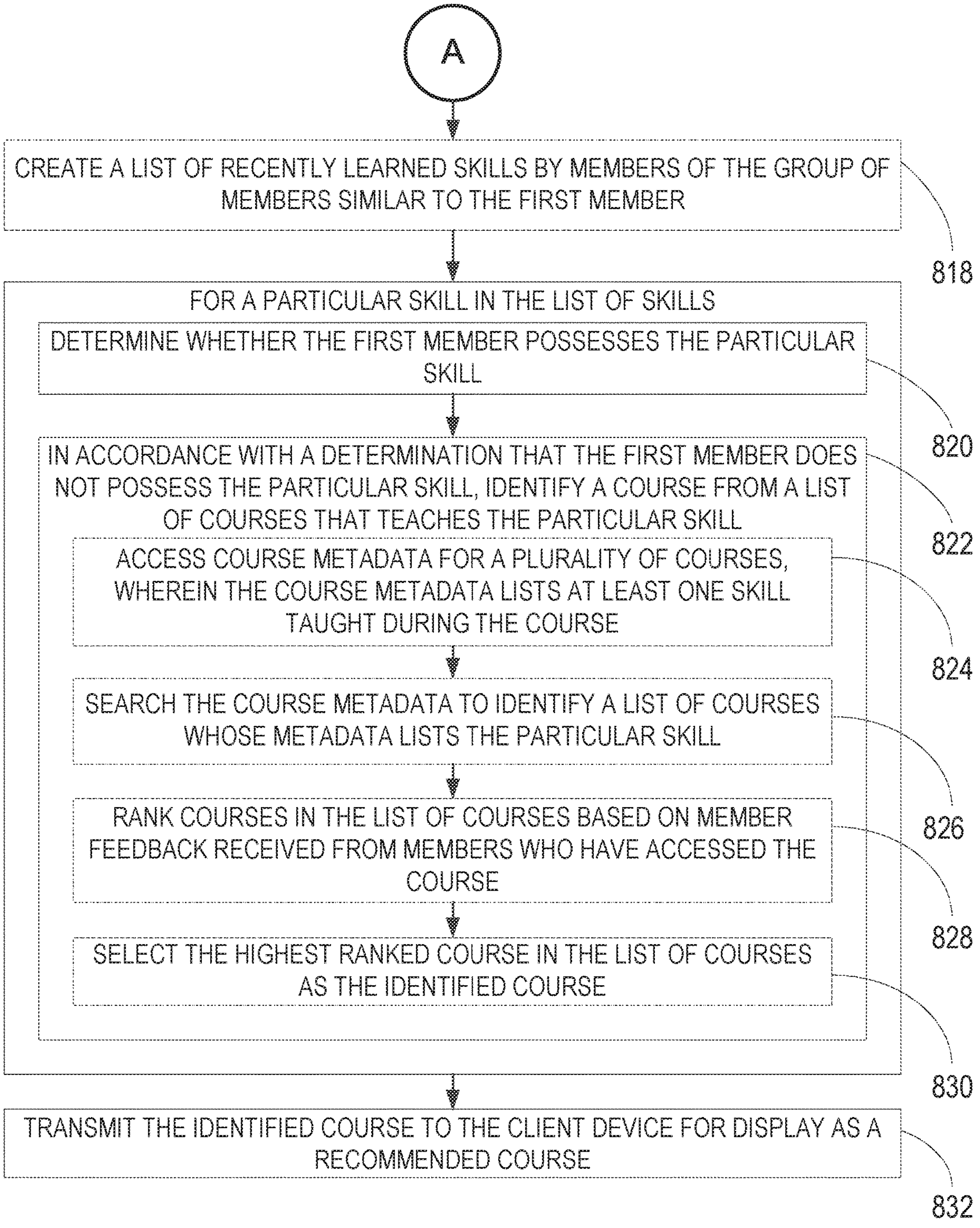

FIG. 8B is a flow diagram illustrating a method, in accordance with some example embodiments, for recommending courses to a member based on the recent skill acquisitions of similar members of a social networking system (e.g., the social networking system 120 in FIG. 1). Each of the operations shown in FIG. 8B may correspond to instructions stored in a computer memory or computer-readable storage medium. Optional operations are indicated by dashed lines (e.g., boxes with dashed-line borders). In some embodiments, the method described in FIG. 8B is performed by the social networking system (e.g., the social networking system 120 in FIG. 1). However, the method described can also be performed by any other suitable configuration of electronic hardware. The method described in FIG. 8B continues from the steps shown in FIG. 8A.

In some embodiments, the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) creates (818) a list of recently learned skills by members of the group of members similar to the first member. In some example embodiments, the social networking system (e.g., the social networking system 120 in FIG. 1) accesses a historical record of skills learned by the similar members to identify skills most recently learned by the similar members. In this way, the social networking system (e.g., the social networking system 120 in FIG. 1) can identify popular skills or skills increasing in importance to members who are similar to the first member.

In some example embodiments, for a particular skill in the list of skills, the social networking system (e.g., the social networking system 120 in FIG. 1) determines (820) whether the first member possesses the particular skill. For example, the social networking system (e.g., the social networking system 120 in FIG. 1) accesses a list of skills the first member possess (e.g., from the member profile) and compares each skill in the list of recently learned skills to the skills possessed by the first member.

In accordance with a determination that the first member does not possess the particular skill, the social networking system (e.g., the social networking system 120 in FIG. 1) identifies (822) a course from a list of courses that teaches the particular skill. In some example embodiments, identifying the course from the list of courses that teaches the particular skill includes the social networking system (e.g., the social networking system 120 in FIG. 1) accessing (824) course metadata for a plurality of courses, wherein the course metadata lists at least one skill taught during the course.

In some example embodiments, the social networking system (e.g., the social networking system 120 in FIG. 1) searches (826) the course metadata to identify a list of courses whose metadata lists the particular skill. In some example embodiments, the social networking system (e.g., the social networking system 120 in FIG. 1) ranks (828) courses in the list of courses based on member feedback received from members who have accessed the course. In some example embodiments, courses are ranked at least in part on the popularity of each course.

In some example embodiments, the social networking system (e.g., the social networking system 120 in FIG. 1) selects (830) the highest-ranked course in the list of courses as the identified course.

In some example embodiments, the social networking system (e.g., the social networking system 120 in FIG. 1) transmits (832) the identified course to the client device for display as a recommended course.

Software Architecture

Figure 9:
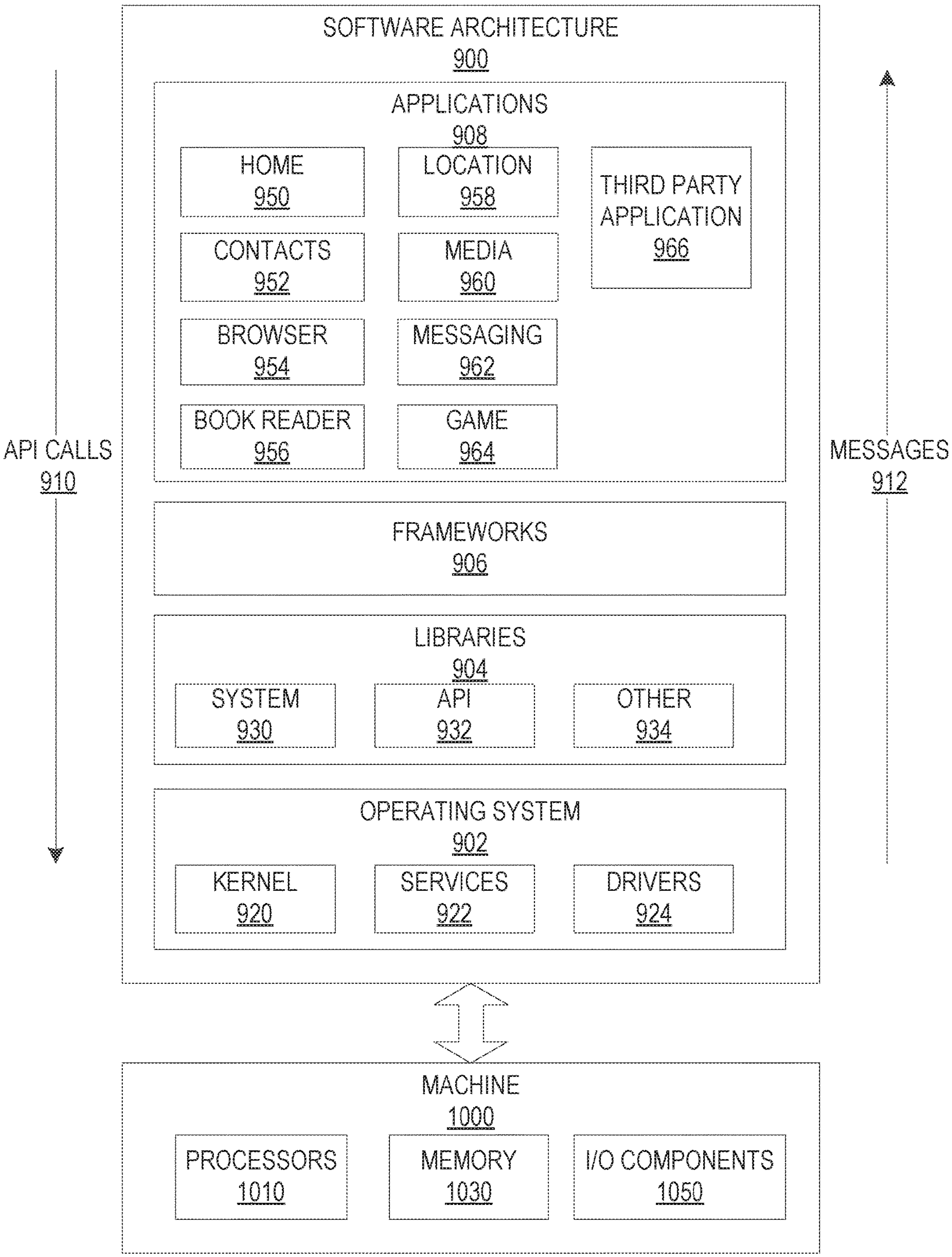
FIG. 9 is a block diagram illustrating an architecture of software, which may be installed on any of one or more devices, in accordance with some example embodiments.

FIG. 9 is a block diagram illustrating an architecture of software 900, which may be installed on any one or more of the devices of FIG. 1. FIG. 9 is merely a non-limiting example of an architecture of software 900, and it will be appreciated that many other architectures may be implemented to facilitate the functionality described herein. The software 900 may be executing on hardware such as a machine 1000 of FIG. 10 that includes processors 1010, memory 1030, and I/O components 1050. In the example architecture of FIG. 9, the software 900 may be conceptualized as a stack of layers where each layer may provide particular functionality. For example, the software 900 may include layers such as an operating system 902, libraries 904, frameworks 906, and applications 908. Operationally, the applications 908 may invoke API calls 910 through the software stack and receive messages 912 in response to the API calls 910.

The operating system 902 may manage hardware resources and provide common services. The operating system 902 may include, for example, a kernel 920, services 922, and drivers 924. The kernel 920 may act as an abstraction layer between the hardware and the other software layers. For example, the kernel 920 may be responsible for memory management, processor management (e.g., scheduling), component management, networking, security settings, and so on. The services 922 may provide other common services for the other software layers. The drivers 924 may be responsible for controlling and/or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 904 may provide a low-level common infrastructure that may be utilized by the applications 908. The libraries 904 may include system libraries 930 (e.g., C standard library) that may provide functions such as memory allocation functions, string manipulation functions, mathematic functions, and the like. In addition, the libraries 904 may include API libraries 932 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 904 may also include a wide variety of other libraries 934 to provide many other APIs to the applications 908.

The frameworks 906 may provide a high-level common infrastructure that may be utilized by the applications 908. For example, the frameworks 906 may provide various graphical user interface (GUI) functions, high-level resource management, high-level location services, and so forth. The frameworks 906 may provide a broad spectrum of other APIs that may be utilized by the applications 908, some of which may be specific to a particular operating system 902 or platform.

The applications 908 include a home application 950, a contacts application 952, a browser application 954, a book reader application 956, a location application 958, a media application 960, a messaging application 962, a game application 964, and a broad assortment of other applications, such as a third-party application 966. In a specific example, the third-party application 966 (e.g., an application developed using the Android™ or iOS™ software development kit (SDK) by an entity other than the vendor of the particular platform) may be mobile software running on a mobile operating system such as iOS™. Android™, Windows® Phone, or other mobile operating systems. In this example, the third-party application 966 may invoke the API calls 910 provided by the mobile operating system, such as the operating system 902, to facilitate functionality described herein.

Example Machine Architecture and Machine-Readable Medium

Figure 10:
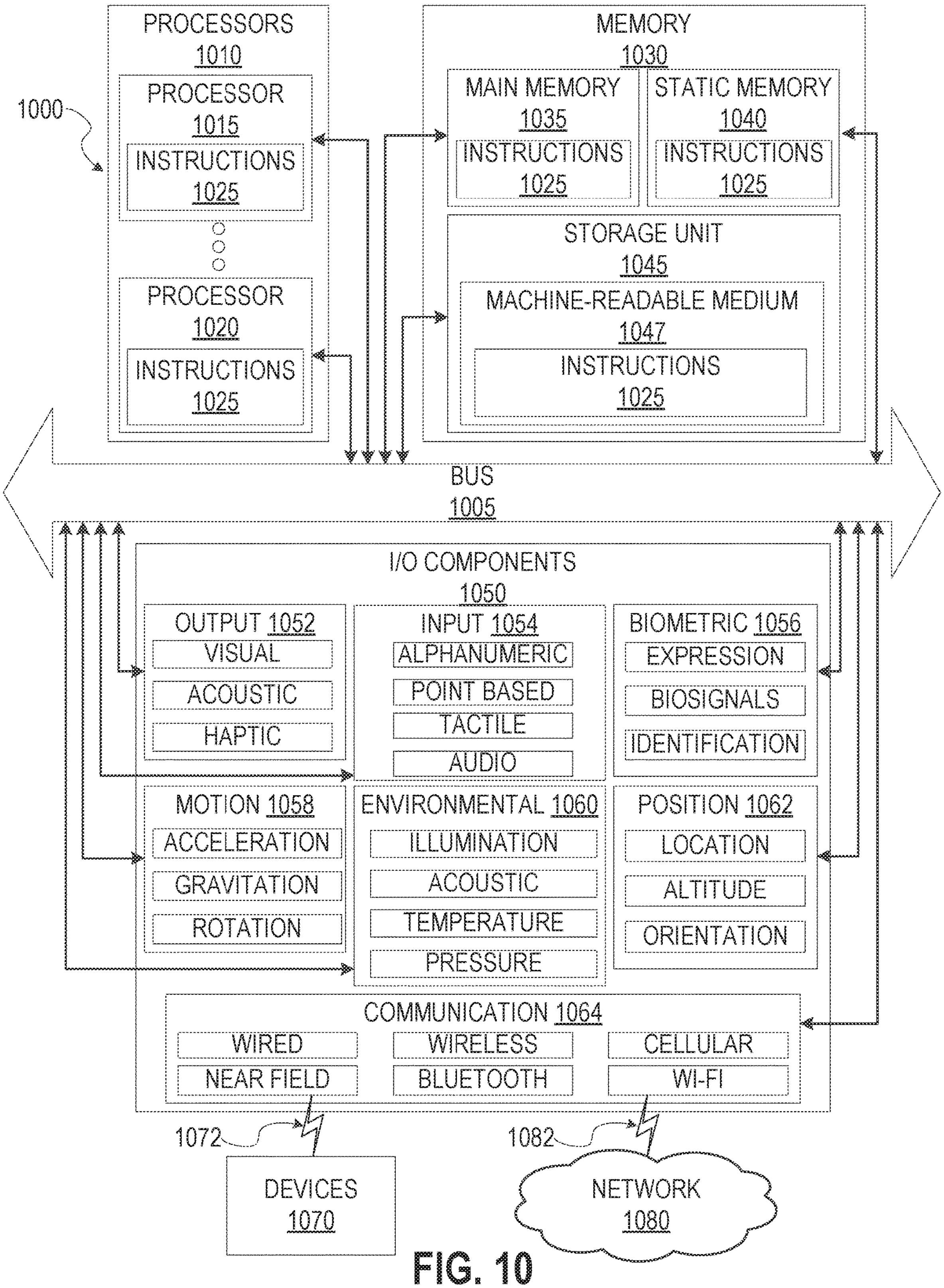
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1025 (e.g., software 900, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1025, sequentially or otherwise, that specify actions to be taken by the machine 1000.

Further, while only a single machine 1000 is illustrated, the term "machine" shall also be taken to include a collection of machines 1000 that individually or jointly execute the instructions 1025 to perform any one or more of the methodologies discussed herein.

The machine 1000 may include processors 1010, memory 1030, and I/O components 1050, which may be configured to communicate with each other via a bus 1005. In an example embodiment, the processors 1010 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1015 and a processor 1020, which may execute the instructions 1025. The term "processor" is intended to include multi-core processors 1010 that may comprise two or more independent processors 1015, 1020 (also referred to as "cores") that may execute the instructions 1025 contemporaneously. Although FIG. 10 shows multiple processors 1010, the machine 1000 may include a single processor 1010 with a single core, a single processor 1010 with multiple cores (e.g., a multi-core processor), multiple processors 1010 with a single core, multiple processors 1010 with multiple cores, or any combination thereof.

The memory 1030 may include a main memory 1035, a static memory 1040, and a storage unit 1045 accessible to the processors 1010 via the bus 1005. The storage unit 1045 may include a machine-readable medium 1047 on which are stored the instructions 1025 embodying any one or more of the methodologies or functions described herein. The instructions 1025 may also reside, completely or at least partially, within the main memory 1035, within the static memory 1040, within at least one of the processors 1010 (e.g., within the processor's cache memory), or any suitable combination thereof, during execution thereof by the machine 1000. Accordingly, the main memory 1035, the static memory 1040, and the processors 1010 may be considered machine-readable media 1047.

As used herein, the term "memory" refers to a machine-readable medium 1047 able to store data temporarily or permanently and may be taken to include, but not be limited to, random-access memory (RAM), read-only memory (ROM), buffer memory, flash memory, and cache memory. While the machine-readable medium 1047 is shown, in an example embodiment, to be a single medium, the term "machine-readable medium" should be taken to include a single medium or multiple media (e.g., a centralized or distributed database, or associated caches and servers) able to store the instructions 1025. The term "machine-readable medium" shall also be taken to include any medium, or combination of multiple media, that is capable of storing instructions (e.g., instructions 1025) for execution by a machine (e.g., machine 1000), such that the instructions 1025, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 may include a wide variety of components to receive input, provide and/or produce output, transmit information, exchange information, capture measurements, and so on. It will be appreciated that the I/O components 1050 may include many other components that are not shown in FIG. 10. In various example embodiments, the I/O components 1050 may include output components 1052 and/or input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 1050 may include biometric components 1056, motion components 1058, environmental components 1060, and/or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 1062 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 and/or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components. Bluetooth® components (e.g., Bluetooth® Low Energy), Wi-Fi® components, and other communication components to provide communication via other modalities. The devices 1070 may be another machine 1000 and/or any of a wide variety of peripheral devices (e.g., a peripheral device coupled via a USB).

Moreover, the communication components 1064 may detect identifiers and/or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1025 may be transmitted and/or received over the network 1080 using a transmission medium via a network interface device (e.g., a network interface component included in the communication components 1064) and utilizing any one of a number of well-known transfer protocols (e.g., HTTP). Similarly, the instructions 1025 may be transmitted and/or received using a transmission medium via the coupling 1072 (e.g., a peer-to-peer coupling) to the devices 1070. The term "transmission medium" shall be taken to include any intangible medium that is capable of storing, encoding, or carrying the instructions 1025 for execution by the machine 1000, and includes digital or analog communications signals or other intangible media to facilitate communication of such software 900.

Furthermore, the machine-readable medium 1047 is non-transitory (in other words, not having any transitory signals) in that it does not embody a propagating signal. However, labeling the machine-readable medium 1047 as "non-transitory" should not be construed to mean that the medium is incapable of movement; the medium should be considered as being transportable from one physical location to another. Additionally, since the machine-readable medium 1047 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method performed at a social networking system, using at least one computer processor, the method comprising:

receiving a request for recommended courses, wherein the request is associated with a first user of the social networking system, the request based on an activation of a user interface element for accessing a subsection of a profile of the first user;

identifying a group of users who are similar to the first user, the identifying based on a comparison of attributes specified in a user profile of the first user in comparison to attributes specified in user profiles corresponding to the group of users, the identifying including applying a model to vectors representing the user profiles, the model created by applying a deep learning or neural network learning algorithm to training data selected from a corpus of user profile information generated by the social networking system;

creating a list of recently learned skills by users of the group of users similar to the first user, wherein the recently learned skills are skills learned within a particular time frame of the request;

for at least one of a top number of ranked skills in the list of recently learned skills, the top number transgressing a threshold ranking:

determining whether the first user possesses the at least one skill;

in accordance with a determination that the first user does not possess the at least one skill, identifying at least one course that teaches the at least one skill from a list of courses;

ranking the identified courses based on user feedback received from users who have accessed the courses;

selecting a highest-ranked course in the list of courses as the identified course; and in response to the receiving of the request, transmitting the selected course to the client device for display on the subsection of the profile of the first user as a recommended course in association with an activatable user interface element for accessing information about the recommended course.

2. The method of claim 1, wherein identifying the group of users who are similar to first user further comprises:

accessing the user profile for the first user in one or more databases;

accessing the user profiles for the group of users in the one or more databases; and identifying that the group contains the first user.

3. The method of claim 2, further comprising:

storing historical user profile data, wherein the historical user profile data includes user profiles as they existed at a particular point in the past.

4. The method of claim 3, wherein accessing the user profiles for the plurality of other users of the social networking system further comprises accessing historical user profile data for the other users from a particular point in the past.

5. The method of claim 4, wherein clustering the first user and the group of users of the social networking system into the plurality of user groups comprises clustering the user profile of the first user with the historical user profiles for the group users to identify users of the plurality of group users who were similar to the first user at a given point in the past.

6. The method of claim 1, wherein creating the list of recently learned skills by the users of the group of users similar to the first user comprises identifying skills learned by the similar users.

7. The method of claim 1, wherein identifying the course from the list of courses that teaches the particular skill further comprises:

accessing course metadata for a plurality of courses, wherein the course metadata lists at least one skill taught during each course of the plurality of courses; and searching the course metadata to identify the list of courses whose metadata lists the particular skill.

8. The method of claim 1, wherein the courses are ranked at least in part based on the popularity of each course.

9. The method of claim 1, wherein the user feedback received from the users comprises data from the users rating the identified courses by quality.

10. A system comprising:

a computer-readable memory storing computer-executable instructions that, when executed by one or more hardware processors, configure the system to perform a plurality of operations, the operations comprising:

receiving a request for recommended courses, wherein the request is associated with a first user of the social networking system, the request based on an activation of a user interface element for accessing a subsection of a profile of the first user;

identifying a group of users who are similar to the first user, the identifying based on a comparison of attributes specified in a user profile of the first member in comparison to attributes specified in user profiles corresponding to the group of users, the identifying including applying a model to vectors representing the user profiles, the model created by applying a deep learning or neural network learning algorithm to training data selected from a corpus of user profile information generated by the social networking system;

creating a list of recently learned skills by users of the group of users similar to the first user, wherein the recently learned skills are skills learned within a particular time frame of the request;

for at least one of a top number of ranked skills in the list of recently learned skills, the top number transgressing a threshold ranking:

determining whether the first user possesses the at least one skill;

in accordance with a determination that the first user does not possess the at least one skill, identifying at least one course that teaches the at least one skill from a list of courses;

ranking the identified courses based on user feedback received from users who have accessed the courses;

selecting a highest-ranked course in the list of courses as the identified course; and in response to the receiving of the request, transmitting the selected course to the client device for display on the subsection of the profile of the first user as a recommended course in association with an activatable user interface element for accessing information about the recommended course.

11. The system of claim 10, wherein the operations for identifying the group of users who are similar to first user further includes operations comprising:

accessing the user profile for the first user in one or more databases;

accessing the user profiles for the group of users in the one or more databases; and identifying that the group contains the first user.

12. The system of claim 11, further comprising operations for:

storing historical user profile data, wherein the historical user profile data includes user profiles as they existed at a particular point in the past.

13. The system of claim 12, wherein operations for accessing the user profiles for the plurality of other users of the social networking system further include operations comprising accessing historical user profile data for the other users from a particular point in the past.

14. The system of claim 13, wherein clustering the first user and the group of users of the social networking system into the plurality of user groups comprises clustering the user profile of the first user with the historical user profiles for the group users to identify users of the plurality of group users who were similar to the first user at a given point in the past.

15. The system of claim 10, wherein operations for creating the list of recently learned skills by the users of the group of users similar to the first user further comprise identifying skills learned by the similar users.

16. A non-transitory computer-readable storage medium storing instructions that, when executed by the one or more processors of a machine, cause the machine to perform operations comprising:

receiving a request for recommended courses, wherein the request is associated with a first user of the social networking system, the request based on an activation of a user interface element for accessing a subsection of a profile of the first user;

identifying a group of users who are similar to the first user, the identifying based on a comparison of attributes specified in a user profile of the first user in comparison to attributes specified in user profiles corresponding to the group of users, the identifying including applying a model to vectors representing the user profiles, the model created by applying a deep learning or neural network learning algorithm to training data selected from a corpus of member profile information generated by the social networking system;

creating a list of recently learned skills by users of the group of users similar to the first user, wherein the recently learned skills are skills learned within a particular time frame of the request;

for at least one of a top number of ranked skills in the list of recently learned skills, the top number transgressing a threshold ranking:

determining whether the first user possesses the at least one skill;

in accordance with a determination that the first user does not possess the at least one skill, identifying at least one course that teaches the at least one skill from a list of courses;

ranking the identified courses based on user feedback received from users who have accessed the courses;

selecting a highest-ranked course in the list of courses as the identified course; and in response to the receiving of the request, transmitting the selected course to the client device for display on the subsection of the profile of the first user as a recommended course in association with an activatable user interface element for accessing information about the recommended course.

17. The non-transitory computer-readable storage medium of claim 16, wherein the operations for identifying the group of users who are similar to first user further including operations comprising:

accessing the user profile for the first member in one or more databases;

accessing the user profiles for the group of users in the one or more databases; and identifying that the group contains the first user.

18. The non-transitory computer-readable storage medium of claim 17, further comprising operations for: storing historical user profile data, wherein the historical user profile data includes user profiles as they existed at a particular point in the past.

19. The non-transitory computer-readable storage medium of claim 18, wherein operations for accessing the user profiles for the plurality of other users of the social networking system further include operations comprising accessing historical user profile data for the other users from a particular point in the past.

20. The non-transitory computer-readable storage medium of claim 19, wherein clustering the first user and the group of users of the social networking system into the plurality of user groups comprises clustering the user profile of the first user with the historical user profiles for the group users to identify users of the plurality of group users who were similar to the first user at a given point in the past.

* * * * *